(12) United States Patent
Barlow et al.

(10) Patent No.: US 8,441,093 B2
(45) Date of Patent: May 14, 2013

(54) SHARED MEMBRANE THERMOPILE SENSOR ARRAY

(75) Inventors: Arthur J. Barlow, Four Marks (GB); Hermann Karagoezoglu, Wiesbaden (DE); Jin Han Ju, Kirkland (CA); Fred Plotz, Tanunsstein (DE); Radu M. Marinescu, Pointe-Claire (CA)

(73) Assignee: Excelitas Technologies Singapore Pte. Ltd., Solaris (SG)

( * ) Notice: Subject to any disclaimer, the term of this patent is extended or adjusted under 35 U.S.C. 154(b) by 0 days.

(21) Appl. No.: 13/088,242

(22) Filed: Apr. 15, 2011

(65) Prior Publication Data

US 2012/0261785 A1 Oct. 18, 2012

(51) Int. Cl.
*H01L 31/058* (2006.01)
*H01L 29/06* (2006.01)
*H01L 35/28* (2006.01)

(52) U.S. Cl.
USPC ............. 257/467; 257/468; 257/470; 257/31; 136/224

(58) Field of Classification Search .......... 257/467–470, 257/31, 132, 294; 136/224
See application file for complete search history.

(56) References Cited

U.S. PATENT DOCUMENTS

| | | | | |
|---|---|---|---|---|
| 5,059,543 A * | 10/1991 | Wise et al. | ...................... | 438/54 |
| 5,982,014 A * | 11/1999 | Paige | ............................ | 136/225 |
| 6,100,463 A * | 8/2000 | Ladd et al. | ..................... | 136/201 |
| 6,335,478 B1 * | 1/2002 | Chou et al. | ..................... | 136/201 |
| 6,348,650 B1 * | 2/2002 | Endo et al. | ..................... | 136/201 |
| 6,565,254 B2 * | 5/2003 | Sato et al. | ...................... | 374/132 |
| 6,987,223 B2 * | 1/2006 | Schneider | ..................... | 136/225 |
| 7,282,712 B2 * | 10/2007 | Shibayama | ................ | 250/338.4 |
| 2001/0024860 A1 | 9/2001 | Park et al. | | |
| 2003/0205670 A1 | 11/2003 | Shibayama | | |
| 2007/0227242 A1 * | 10/2007 | Mayer et al. | ............... | 73/204.15 |
| 2007/0297485 A1 | 12/2007 | Ernst | | |
| 2010/0032788 A1 * | 2/2010 | Ulbrich | ......................... | 257/464 |

OTHER PUBLICATIONS

Xu et al., "Design, fabrication and charaterization of a front etched micromachined thermopile for IR detector", J. Micromech, Microeng, vol. 20, Published Oct. 4, 2010, pp. 1-10.*
Mattsson et al., "Design of Micromachined Thermopile Infrared Sensor With a Self-Supported SiO2/SU-8 membrane", IEEE Sensor Journal, vol. 8, No. 12, Dec. 2008, pp. 2044-2052.*
Hartwig et al., "A Highly Sensitive IR-Optical Sensor for Ethylene Monitoring", SPIE 5836-49 V. 1 , Apr. 11, 2005, pp. 1-9.*
Xu et al., "Integrated micromachined thermopile IR detectors with an XeF2 dry-etching process", J. Micromech, Microeng, vol. 19, Public Oct. 20, 2009, pp. 1-11.*
Wu et al., "A thermopile detector array with scaled TE elements for use in an integrated IR microspectrometer", Journal of Micromechanics and Microengineering, vol. 18, 2008, pp. 1-7.

(Continued)

*Primary Examiner* — Ha Tran T Nguyen
*Assistant Examiner* — Dzung Tran
(74) *Attorney, Agent, or Firm* — Peter A. Nieves; Sheehan Phinney Bass + Green PA (57) ABSTRACT

A thermopile sensor array is provided. The thermopile sensor array may include multiple pixels formed by multiple thermopiles arranged on a single common shared support membrane. A separation between the edge of the shared support membrane and the outermost thermopile(s) may be included to provide additional thermal isolation between the thermopile and an underlying silicon substrate.

27 Claims, 10 Drawing Sheets

OTHER PUBLICATIONS

"Thermopile Array: TPL64Xe", Micro-Hybrid Electronic GmbH, Apr. 2008, 1 page.
"Thermopile Array: TPL640Xe", Micro-Hybrid Electronic GmbH, May 2009, 1 page.
"SLA32: Silicon Based Thermopile Detector", Dexter Research Center, Inc., Aug. 21, 2009, 4 pages.
"Specification: TSEM0108-L", HI-Planartechnik GmbH, Version 1.0, Apr. 2005, pp. 1-12.

* cited by examiner

SHARED MEMBRANE THERMOPILE SENSOR ARRAY

FIELD

The present disclosure relates generally to thermopiles, and more particularly, to thermopile sensor arrays having a shared membrane.

RELATED ART

A thermopile is an infrared radiation (IR) detector commonly used for making non-contact temperature measurements. For example, thermopiles are used in ear thermometers, proximity sensors, heat flux sensors, and the like. Thermopiles are made up of a series of electrically connected thermocouple pairs, each pair made up of dissimilar conducting or semi-conducting materials with different Seebeck coefficients. For example, N-type poly-silicon and P-type poly-silicon are often used in conventional thermopiles.

Generally, one end of each thermocouple is placed in contact with a membrane operable to collect IR energy, while the other end is placed on a supporting substrate. The collected IR energy creates a temperature gradient across the thermocouple, causing the thermocouple to generate an output voltage via the Seebeck effect. For a thermocouple having known characteristics, the output voltage may be converted into a temperature value.

Since the output voltage of a thermocouple is relatively small, generally in the range of a few microvolts, the output voltage must be amplified prior to being converted into a temperature value. However, amplification may introduce a margin of error or noise into the measurement result. Thus, to reduce the amount of error introduced, a larger output voltage may be desired since a larger voltage requires less amplification. To accomplish this, some thermopiles include multiple thermocouples connected in series to generate a larger output voltage.

Multiple thermopiles may be arranged together in a line on a silicon chip to form a thermopile array. These may be used, for example, in proximity detectors, thermometers, security detectors, surveillance, and the like. Conventional thermopile arrays use a thin membrane of SiN or SiO2 placed on a silicon chip, with one membrane per thermopile "pixel." Surrounding each pixel is a "cold" frame of silicon that forms the individual membrane per pixel in the array. In these thermopile arrays, the cold frames are arranged in close proximity to the "hot" (radiation-absorbing) junction of the sensor which limits the temperature rise of the membrane, and consequently, the temperature rise of the thermopile. Specifically, the absorbed IR radiation heats up the hot junction, but this heat is conducted to the cold frame of silicon relatively quickly or by a finite amount. This reduces the magnitude of the temperature gradient formed across each thermopile, which results in lower thermopile output voltages. Specifically, the necessity to have a cold frame along the sides adjacent to the preceding and next pixel in the line of pixels reduces the magnitude of the temperature gradient formed across each thermopile. These reductions in temperature gradient are undesirable as the out put will require greater amounts of amplification, thereby introducing a larger margin of error or noise.

Additionally, the necessity to have a cold frame along the sides adjacent to the preceding and next pixel in the line of pixels uses valuable space, leaving the array with necessary "dead" spaces in it. This results in lost opportunity to collect radiation, or in spectroscopy applications, to miss spectral features altogether.

Thus, a compact thermopile sensor array having a higher thermal sensitivity is desired.

BRIEF SUMMARY

A thermopile sensor array for monitoring radiation is disclosed. The thermopile sensor array may include a semiconductor substrate; a shared support membrane positioned on the semiconductor substrate; a plurality of thermopiles arranged on the shared support membrane and semiconductor substrate, wherein a first portion of each of the plurality of thermopiles is in contact with the shared support membrane, and wherein a second portion of each of the plurality of thermopiles is in contact with the semiconductor substrate; and one or more absorbers thermally coupled to each of the plurality of thermopiles, wherein each of the plurality of thermopiles is operable to generate a voltage in response to receiving radiation from the one or more absorbers, the voltage corresponding to the amount of received radiation.

In some examples, the shared support membrane may be a single continuous membrane. In other examples, the thermopile sensor array may include only one shared support membrane. The support membrane may comprise silicon nitride, silicon dioxide, or an organic plastic. The thickness of the shared support membrane may be between 0.1 µm to 5 µm.

In some examples, a cavity may be formed beneath the shared support membrane such that the shared support membrane at least partially covers the cavity.

In some examples, each thermopile may be separated from a neighboring thermopile by a distance of less than 12 µm. The thermopile sensor array may include 8, 16, 32, 64, or more thermopiles. The thermopile sensor array may include a distance between an edge of the shared support membrane and any of the plurality of thermopiles of at least 100 µm, 150 µm, or 200 µm.

In some examples, the plurality of thermopiles may be arranged in a 2×2 array, line array, or circular array. In other examples, each of the plurality of thermopiles comprises a plurality of thermocouple legs, and wherein the thermocouple legs of each of the plurality of thermopiles are arranged vertically on the shared support membrane.

In another example, the thermopile sensor array may include a semiconductor substrate; a shared support membrane positioned on the semiconductor substrate, wherein the shared support membrane comprises a material having a thermal conductivity less than about 30 W/mK; a plurality of thermopiles arranged in a substantially parallel configuration along the length of the shared support membrane and semiconductor substrate, wherein a first portion of each of the plurality of thermopiles is in contact with the shared support membrane, and wherein a second portion of each of the plurality of thermopiles is in contact with the semiconductor substrate; and one or more absorbers thermally coupled to each of the plurality of thermopiles, wherein each of the plurality of thermopiles is operable to generate a voltage in response to receiving radiation from the one or more absorbers, the voltage corresponding to the amount of received radiation.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
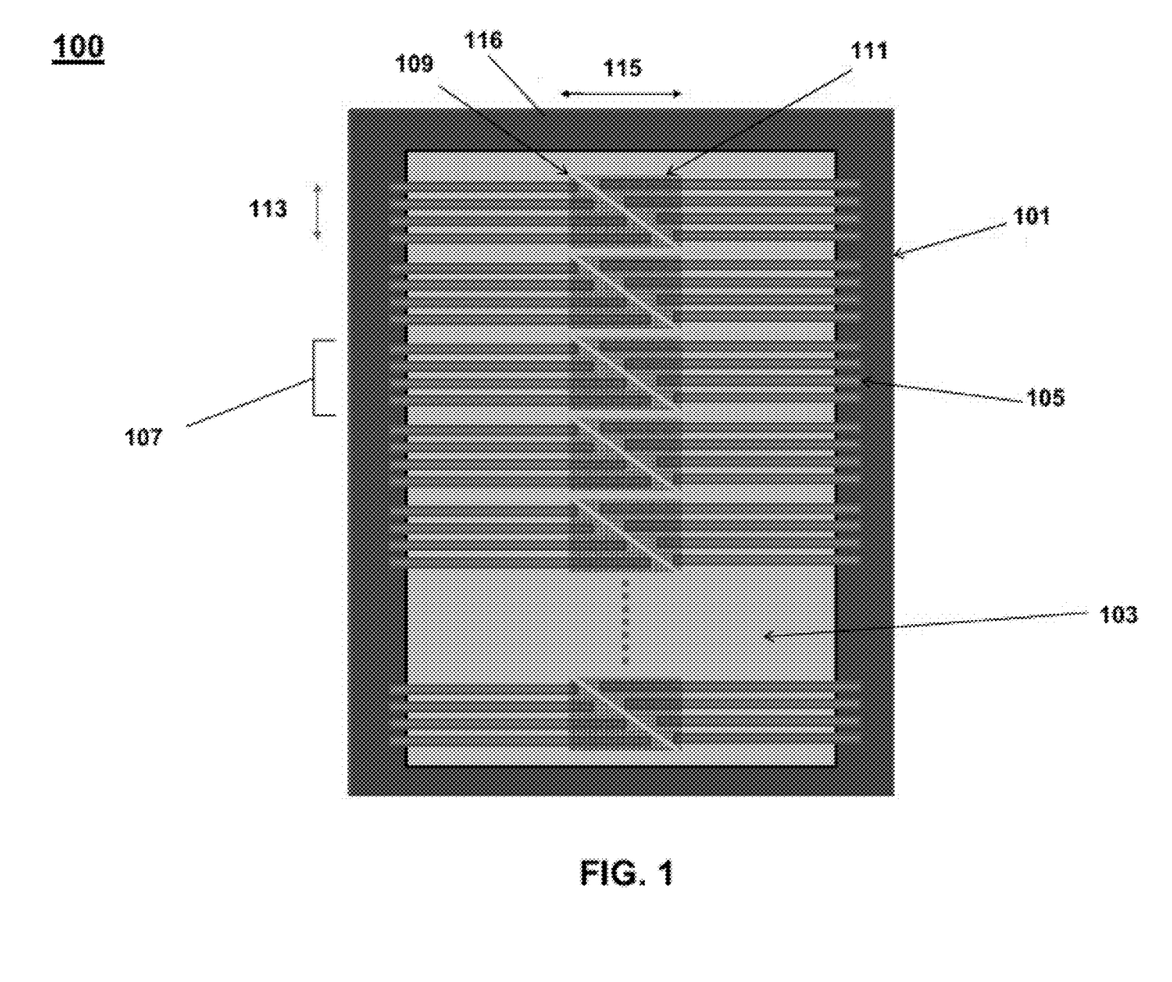
FIG. 1 illustrates an overhead view of an exemplary shared membrane thermopile array.

FIG. 1 illustrates an overhead view of exemplary shared membrane thermopile array 100. Shared membrane thermopile array 100 may be formed on silicon substrate 101. Shared membrane thermopile array 100 may include a shared support membrane 103 for providing structural support for the thermopiles. Shared support membrane 103 may comprise a material having a low thermal conductivity, for example, a thermal conductivity of less than about 30 W/mK, less than about 20 W/mK, less than about 15 W/mK, or less than about 10 W/mK. Shared support membrane 103 may include, for example, silicon nitride, silicon dioxide, organic plastic, or the like, with a thickness in the range 0.05 μm to 7 μm, for example, about 0.1 μm, about 2 μm, about 3 μm, about 4 μm, about 5 μm, or about 7 μm. Selecting such a material helps to limit the amount of heat conducted away from the thermopiles by shared support membrane 103. Additionally, in some embodiments, shared support membrane 103 may be suspended over a cavity (not shown) to provide at least partial thermal isolation between shared support membrane 103 and silicon substrate 101. Shared support membrane 103, in some embodiments, may be a continuous membrane. In other words, shared support membrane 103 may comprise a single generally uninterrupted sheet of membrane material.

Shared membrane thermopile array 100 may further include one or more thermopiles 107 positioned on shared support membrane 103. Thermopiles 107 include one or more pairs of thermocouple legs 105 having different Seebeck coefficients. For example, pairs of thermocouple legs 105 may include dissimilar conducting or semi-conducting materials such as N-type poly-silicon and P-type poly-silicon. One end of each thermocouple leg 105 may be placed in contact with shared support membrane 103 to collect IR energy, while the other end is placed on a supporting silicon substrate 101. The collected IR energy creates a temperature gradient across the pair of thermocouple legs 105, causing the thermocouple to generate an output voltage via the Seebeck effect.

To increase the output voltage created by the pairs of thermocouple legs 105, multiple pairs of thermocouple legs 105 may be electrically coupled in series. Thus, thermopiles 107 may include one or more pairs of thermocouple legs 105. The pairs of thermocouple legs 105 may be arranged horizontally along the surface of shared support membrane 103, or may be stacked vertically, as described in U.S. application Ser. No. 61/324,221, which is incorporated by reference herein in its entirety. While thermopiles 107 are shown having four pairs of thermocouple legs 105, one of ordinary skill will appreciate that thermopiles 107 may include any number of thermocouple pairs. Additionally, it should be appreciated that any number of thermopiles 107 may be used. For example, 8, 16, 32, 64, or more thermopiles 107 may be included in shared membrane thermopile array 100.

Additionally, while thermopiles 107 are shown as being arranged in parallel, other configurations are possible, such as a 2×2 array, 1×N line array, 2×N dual-line arrays, circular array, and the like. Additionally, while thermopiles 107 are shown as being arranged in parallel with the "cold" ends of the thermocouple legs 105 over the substrate, other configurations are possible, for example, thermopiles 107 arranged in a 2×2 square array, 3×3 square array, or a larger square array.

Shared membrane thermopile array 100 may further include one or more absorbers 111 positioned over or under a portion of thermopiles 107. Absorber 111 may be configured to absorb IR radiation and may be made of any thermally absorptive material, such as carbon-black, black-gold, other compounds or organic compounds or mixtures, or the like.

In some embodiments, shared membrane thermopile array 100 may include a single absorber 111 spanning the length and/or width of the array and positioned over each thermopile 107, or, in other embodiments, may include multiple absorbers 111 positioned over a subset of all thermopiles 107. In yet other embodiments, multiple absorbers 111 may be positioned over each thermopile 107. Absorbers 111 may be arranged in any shape, for example, a square, rectangle, triangle, and like the. The end of thermocouple leg 105 in thermal contact with absorber 111 will be referred to herein as the "hot junction." The end of thermocouple leg 105 opposite the hot junction will be referred to herein as the "cold junction."

One or more thermopiles 107 may form a pixel 109, which are areas where shared membrane thermopile array 100 is capable of measuring IR energy. More specifically, the pixels may be formed by the hot junctions of one or more thermopiles 107. For example, as shown in FIG. 1, the hot junction of each thermopile 107 is shaded to indicate separate (in this illustration, triangular) pixels 109 having a width 115. Thus, to increase sensitivity of shared membrane thermopile array 100, it is desirable to position pixels 109 together as closely as possible to reduce the "dead" space between pixels. By using a single shared support membrane 103, rather than individual membranes for each pixel 109, the space between pixels can be reduced, thereby increasing the pixel density of shared membrane thermopile array 100. Moveover, by using a single shared support membrane 103, rather than individual membranes for each pixel 109, the section of cold frame lying between each pixel that would otherwise reduce the temperature gradient formed across each thermopile may be eliminated, thereby increasing the sensitivity of shared membrane thermopile array 100. However, one of ordinary skill would appreciate that reducing the distance between pixels and removing those sections of cold frame between each pixel may result in an increase in "crosstalk." Crosstalk refers to the phenomenon where radiation received at one pixel radiates outwards to interfere with measurements taken by neighboring pixels. It may be possible to minimize this crosstalk by careful choice of pixel size, distance between pixels, and other variations in geometry.

In one exemplary embodiment, shared membrane thermopile array 100 may have a length of about 4.5 mm and a width 113 of about 0.58 mm Additionally, each thermopile 107 may have a width of about 10 µm and a length of about 260 µm (half pixel). Thermopiles 107 may be separated from the neighboring thermopile 107 by a distance of a minimum of the width of a single thermocouple plus a gap between thermocouples, for example, 10 µm+2 µm=12 µm. The width of absorber 111, and thus the width 115 of each pixel, may be about 70 µm. While specific values are provided above, it should be appreciated that other dimensions may be used depending on the desired application. For instance, one of the benefits of using a single shared membrane is that the width of thermopile 107 may be increased by increasing the number of thermocouple pairs per thermopile without having to adjust the membrane dimensions. Additionally, the length of shared membrane thermopile array 100 may be increased to allow for more thermopiles 107 to be included. In some examples, the length of thermopile array 100 may be increased by 20% or more, based on processability, application, and cost limitations.

In addition to improving the use of space on silicon substrate 101, using a single shared support membrane 103 results in higher temperatures at the pixels 109 and hot junctions of each thermopile. Higher temperatures at the pixels 109 and hot junctions generate larger temperature gradients across pairs of thermocouple legs 105, resulting in larger output voltages. This desirably produces more accurate measurements since the larger output voltages require less amplification.

Figure 2:
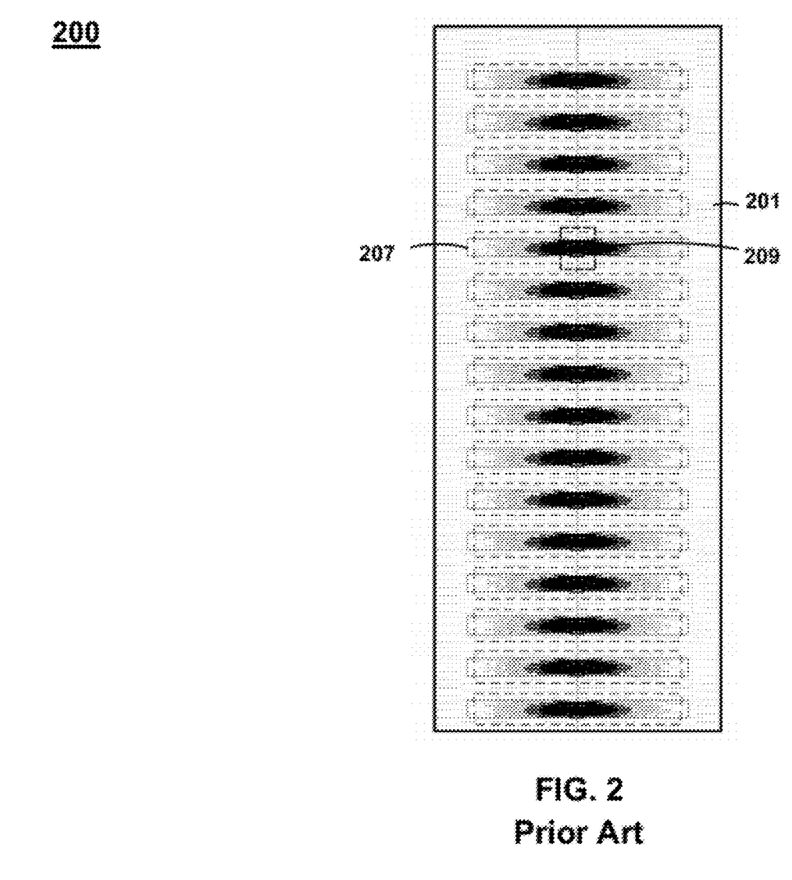
FIG. 2 illustrates a heat-map of an exemplary thermopile array having separate support membranes for each pixel.

The higher temperatures are made possible because pixels 109 no longer border a "cold" silicon substrate 101 frame on all four sides, as is the case in conventional thermopile sensor arrays. For example, FIG. 2 shows a heat-map of an exemplary conventional thermopile sensor array 200 having separate support membranes for each thermopile 207. The dark areas of thermopile 207 represent higher temperatures, while the light areas represent lower temperatures. Since each thermopile 207 in thermopile sensor array 200 is formed on physically separate support membranes, the hot junction, corresponding to absorber pixel 209, is surrounded on four sides (left, right, above, and below as shown in FIG. 2) by silicon material of silicon substrate 201. Since the silicon material has higher thermal conductivity (e.g., about 148 W/mK) compared to the support membrane (e.g., less than about 10-30 W/mK), is thick in cross section, and remains cold relative to the hot junction of thermopile 207, this configuration reduces the temperature rise of the membrane, and consequently, reduces the temperature rise of the absorber pixel 209. This results in lower temperatures at pixels 209, smaller temperature gradients across thermopiles 207, lower output voltages produced by thermopiles 207, and ultimately, less accurate measurements.

Figure 3:
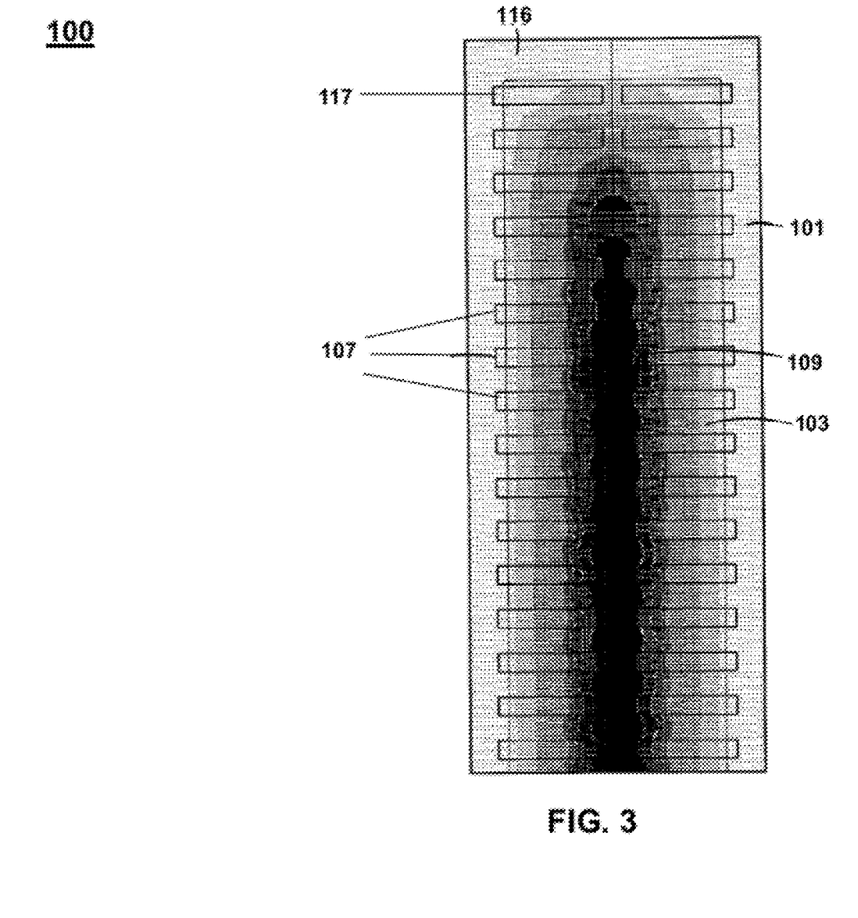
FIG. 3 illustrates a heat-map of an exemplary shared support membrane thermopile array.

Referring now to FIG. 3, a heat map of exemplary shared membrane thermopile array 100 is shown. Similar to the heat-map of FIG. 2, the dark areas of thermopile 107 represent higher temperatures, while the light areas represent lower temperatures. As can be seen in FIG. 3, the thermopiles 107 located towards the center (bottom of FIG. 3) of shared membrane thermopile array 100 have higher temperatures at their hot junctions than those near the end (top of FIG. 3) of the array. This is because the thermopiles 107 near the end of the array are positioned next to, or at least near, the cold silicon end-frame 116, formed by silicon substrate 101, thereby limiting the temperature rise at these locations. The hot junctions of thermopiles 107 near the center of the array, however, do not border a cold silicon frame and are therefore allowed to rise to higher temperatures. As discussed above, higher temperatures at the hot junctions result in larger temperature gradients across thermopiles 107 and, as a result, more accurate IR measurements.

Comparing the heat-map shown in FIG. 3 with that shown in FIG. 2, it can be seen that the temperatures obtained by at least some of the hot junctions of thermopiles 107 of shared membrane thermopile array 100 are higher than those obtained by thermopiles 207 of thermopile sensor array 200. In some examples, the temperature gradient produced across a thermopile in shared membrane thermopile array 100 may be ten times or more larger than in thermopile sensor array 200.

As discussed above and shown in FIG. 3, the thermopiles located near cold silicon end-frame 116 (e.g., thermopile labeled 117) may not reach as high a temperature as those near the center (e.g., those labeled 107). Thus, in some embodiments, the distance between each end of shared membrane thermopile array 100 and the outermost thermopiles 117 may be increased. In other words, a "dead" space may intentionally be formed at the ends of shared support membrane 103 to provide additional thermal isolation between the cold silicon end-frame 116 of silicon substrate 101 and the outermost thermopiles 117. In some embodiments, the dead space may be about 50 µm, about 75 µm, about 100 µm, about 150 µm, about 200 µm, or more. The skilled artisan would know how to select a width for the dead space based on the configuration of shared membrane thermopile array 100. In some examples, the selection may be based on a balance between minimizing the temperature drop on thermopile 117 and the amount of wasted space added to the silicon substrate 101.

Figure 4A:
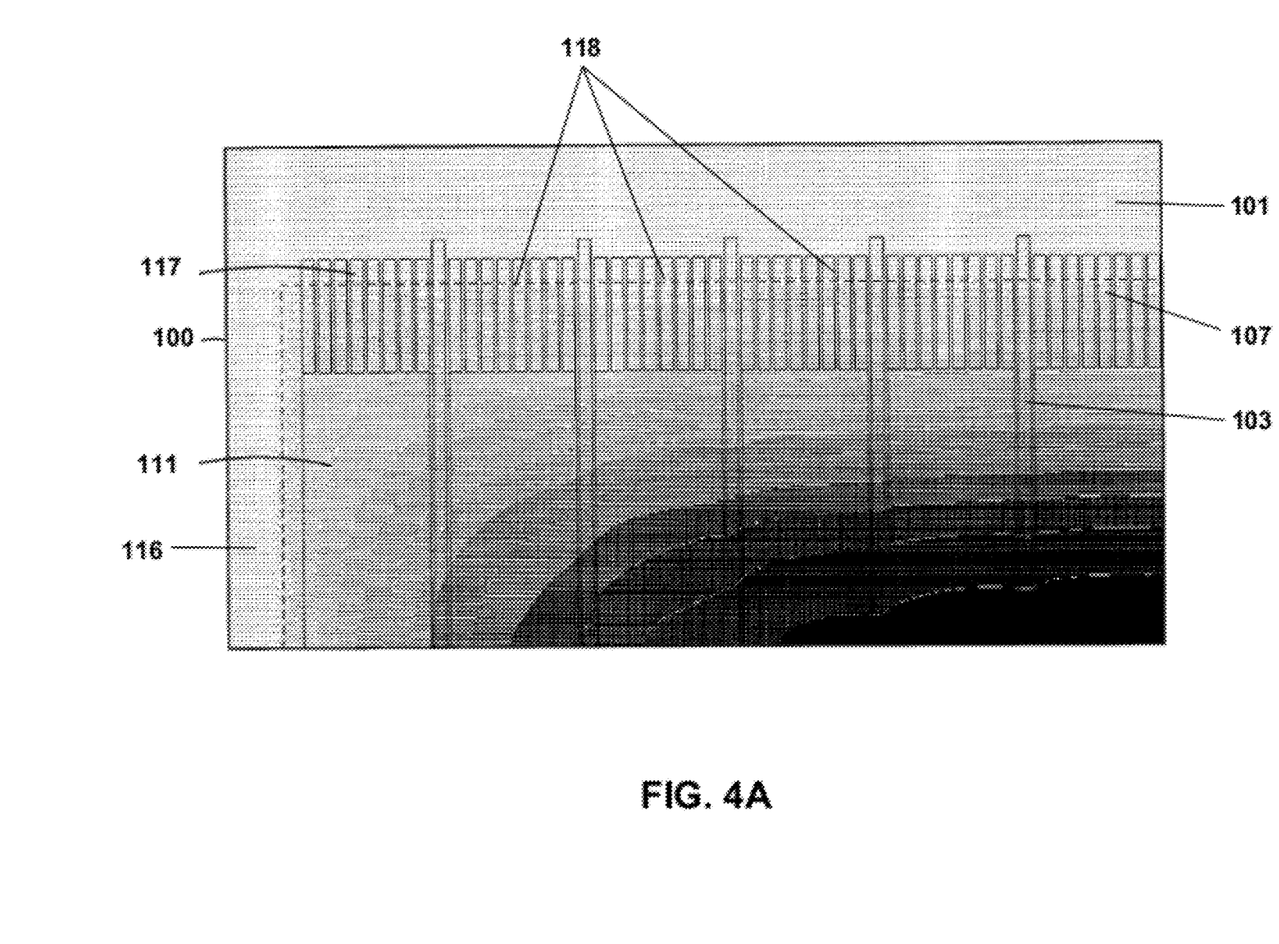
FIGS. 4A-C illustrate heat-maps of exemplary shared support membrane thermopile arrays having dead spaces of varying sizes.
Figure 4B:
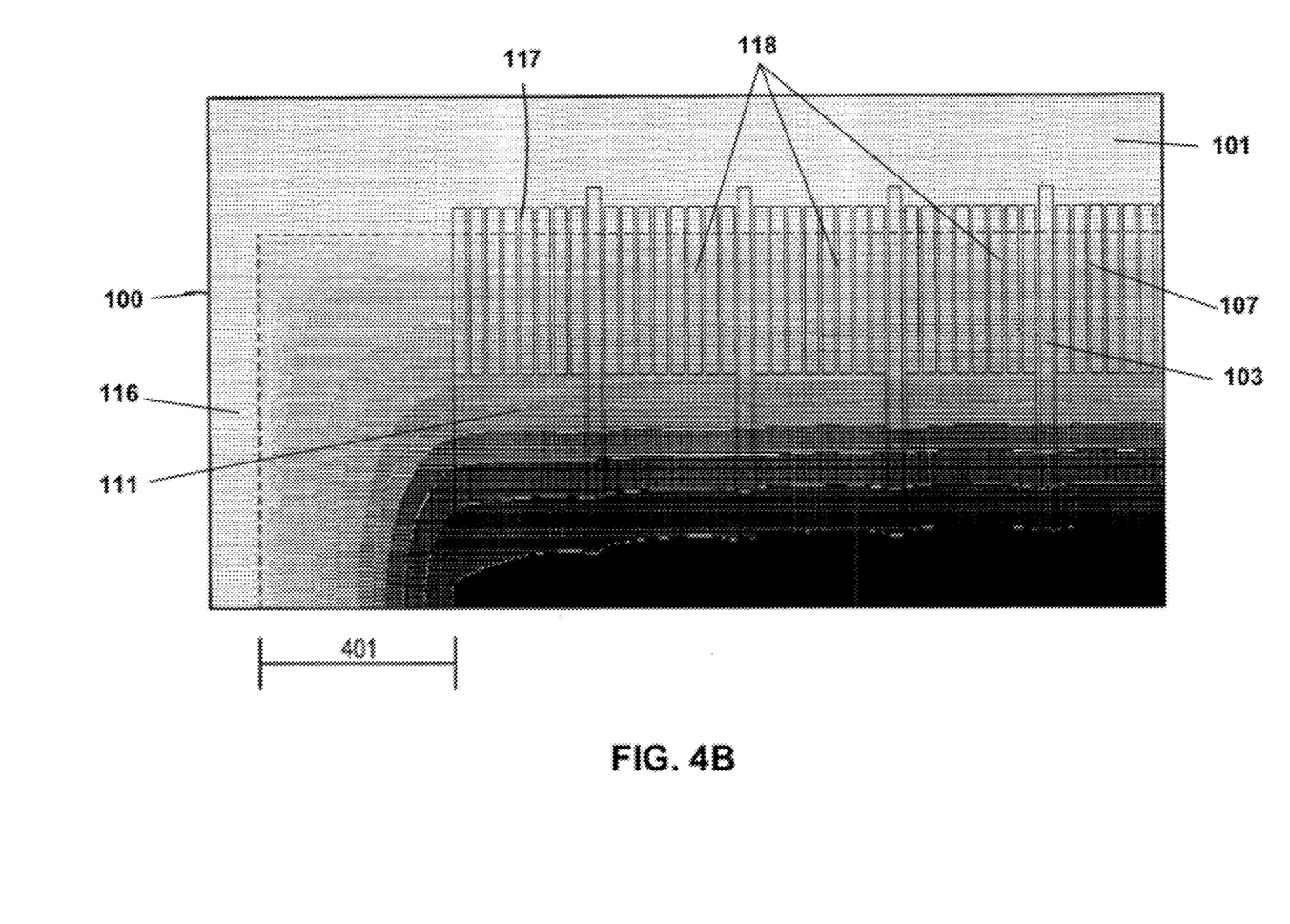
Figure 4C:
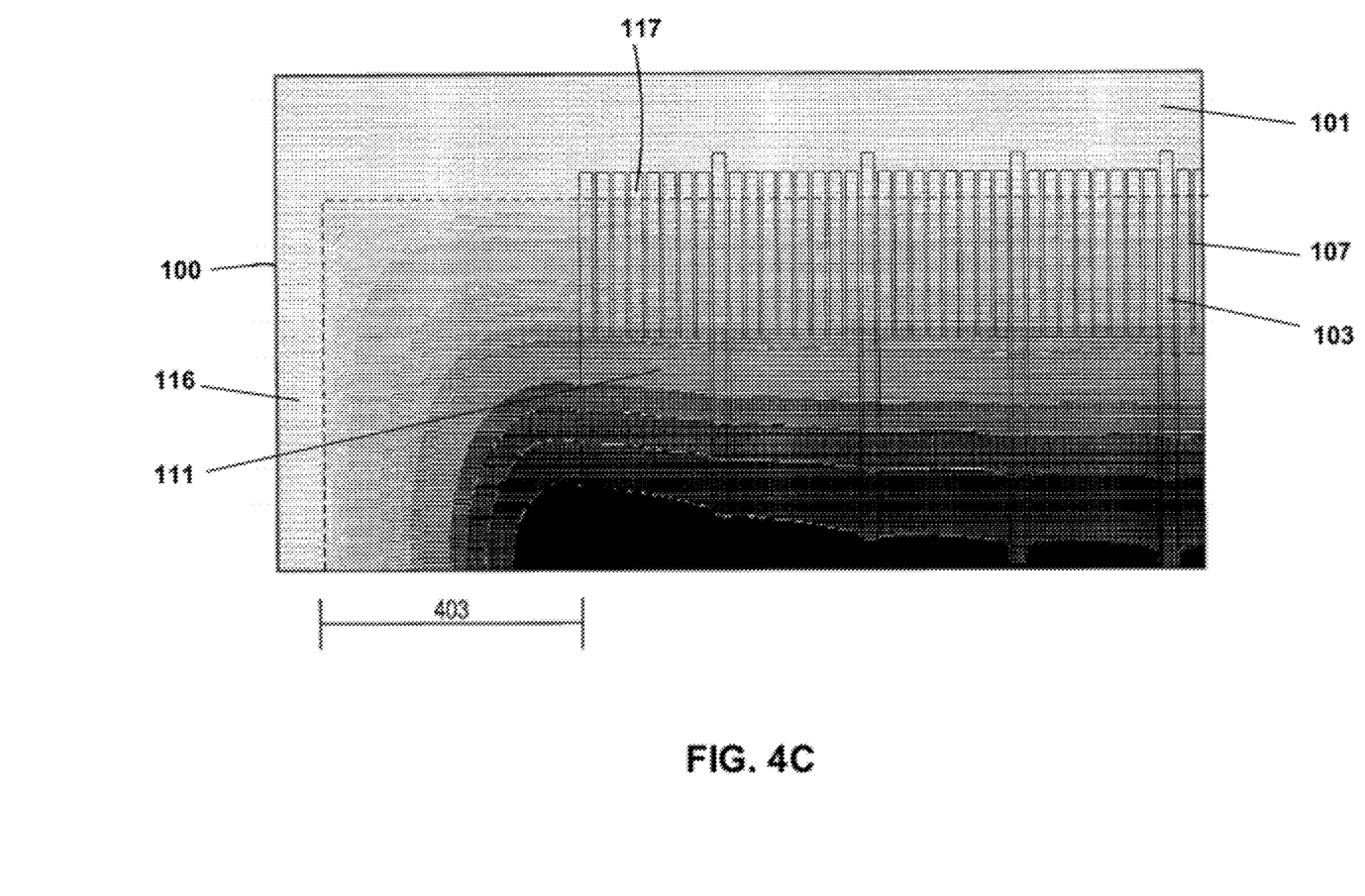

FIGS. 4A-C illustrate the effects of using dead spaces of various sizes on the temperature of shared membrane thermopile array 100 when uniform amounts of radiation are applied to each pixel. Specifically, FIG. 4A illustrates a heat-map of shared membrane thermopile array 100 having little to no dead space. As can be seen, the thermopiles 117 near the edge (left side of the figure) of shared membrane thermopile array 100 have very different temperatures at their corresponding hot junctions than those towards the center (right of the figure). Depending of the thermopile dimensions, more than only thermopile 117 may show different temperatures compared to the center thermopiles 107. This is due to the outermost thermopile 117 or thermopiles 118 being near the cold silicon end-frame 116, while the inner thermopiles 107 are bordered by shared support membrane 103. In this configuration and in one exemplary embodiment having 32 pixels, simulations have shown that a total dT of 855° C. may be generated.

FIG. 4B shows a heat-map of one embodiment of shared membrane thermopile array 100 having a dead space 401 of about 150 µm. As can be seen in this figure, there is greater uniformity in temperatures across hot junctions of thermopiles 107, 117, and 118. This is due to the thermal isolation between thermopiles 117, 118 and the cold silicon end-frame 116 provided by the dead space 401. In this configuration and in one exemplary embodiment having 32 pixels, simulations have shown that a total dT of 905° C. may be generated. This creates an approximately 5.8% increase in performance over the shared membrane thermopile array having little to no dead space shown in FIG. 4A. Additionally the temperature difference of the hot junctions to the cold frame of thermopiles 117, 118 may be increased by a factor of 2.

FIG. 4C shows a heat-map of another embodiment of shared membrane thermopile array 100 having a dead space 403 of about 200 μm. As can be seen in this figure, thermopiles 117, 118 near the edge (left side of the figure) of have higher temperatures at their hot junctions than those towards the center (right of the figure). In this case, the bare membrane in the dead space acts as a better thermal insulator than the membrane covered by thermocouple legs that increases its thermal conductivity. In this configuration and in one exemplary embodiment having 32 pixels, simulations have shown that a total dT of 912° C. may be generated. This creates an approximately 6.7% increase in performance over the shared membrane thermopile array 100 having little to no dead space shown in FIG. 4A.

Figure 5:
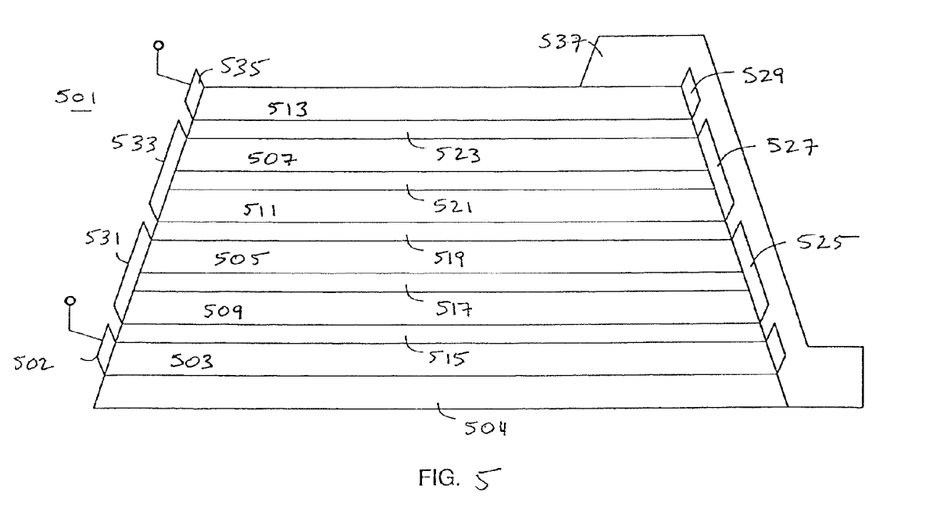
FIG. 5 illustrates a cross-sectional view of an exemplary vertically stacked thermopile.

FIG. 5 illustrates a cross-sectional view of exemplary stacked thermopile 501. Stacked thermopile 501 may include support membrane 504 for providing mechanical support for stacked thermopile 501. Further, support membrane 504 may be made of a material having a low thermal conductivity, such as silicon nitride, silicon dioxide, organic plastic, or the like. Selecting such a material limits the amount of heat conducted by support membrane 504 from one end of stacked thermopile 501 to the other.

Stacked thermopile 501 may further include one or more thermocouple pairs, each pair made up of thermoelectric layers having different Seebeck coefficients. For example, the thermoelectric layers may be made of dissimilar conducting or semiconducting materials such as N-type poly-silicon and P-type poly-silicon. These thermoelectric layers may be stacked vertically in an alternating fashion and separated by insulating layers. In the illustrated embodiment, layers 503, 505 and 507 represent the N-type poly-silicon material and layers 509, 511 and 513 represent the P-type poly-silicon material. The insulating layers (e.g., insulating layers 515, 517, 519, 521, and 523) may be made of any dielectric material, such as poly-oxide, silicon dioxide, or the like.

In one example, stacked thermopile 501 may include three thermocouple pairs. The first thermocouple pair may be made up of N-Poly layer 503 formed vertically above support membrane 504, insulating layer 515 formed vertically above N-Poly layer 503, and P-Poly layer 509 formed vertically above insulating layer 515. The first thermocouple pair may further include metal contact 525 for electrically coupling N-Poly layer 503 to P-Poly layer 509. Metal contact 525 may be formed of any electrically conducting metal, such as aluminum, gold, or the like.

Stacked thermopile 501 may further include insulating layer 517 formed vertically above the first thermocouple pair. The second thermocouple pair may be formed vertically above insulating layer 517. The second thermocouple pair may be made up of N-Poly layer 505 formed vertically above insulating layer 517, insulating layer 519 formed vertically above N-Poly layer 505, and P-Poly layer 511 formed vertically above insulating layer 519. The second thermocouple pair may further include metal contact 527 for electrically coupling N-Poly layer 505 to P-Poly layer 511. Metal contact 527 may be-made of the same or a similar material as metal contact 525.

Stacked thermopile 501 may further include metal contact 531 for electrically coupling the first thermocouple pair in series with the second thermocouple pair. Metal contact 531 may be made of the same or a similar material as metal contact 525. By configuring the thermocouple pairs in series, stacked thermopile 501 may generate an output voltage having a larger magnitude than a thermopile having a single thermocouple pair or multiple thermocouple pairs connected in parallel. As discussed above, a larger voltage may result in a more accurate temperature measurement.

Stacked thermopile 501 may further include insulating layer 521 formed vertically above the second thermocouple pair. The third thermocouple pair may be formed vertically above insulating layer 521. The third thermocouple pair may be made up of N-Poly layer 507 formed vertically above insulating layer 521, insulating layer 523 formed vertically above N-Poly layer 507, and P-Poly layer 513 formed vertically above insulating layer 523. The third thermocouple pair may further include metal contact 529 for electrically coupling N-Poly layer 507 to P-Poly layer 513. Metal contact 529 may be made of the same or a similar material as metal contact 525.

Stacked thermopile 501 may further include metal contact 533 for electrically coupling the second thermocouple pair in series with the third thermocouple pair. Metal contact 533 may be made of the same or a similar material as metal contact 525. By configuring the thermocouple pairs in series, stacked thermopile 501 may generate an output voltage having a larger magnitude than a thermopile having a single thermocouple pair or multiple thermocouple pairs connected in parallel. As discussed above, a larger voltage may result in a more accurate temperature measurement.

In one example, metal contacts 525, 527, and 529 may be configured to contact absorber 537. Absorber 537 may be configured to absorb IR radiation and may be made of any thermally absorptive material, such as carbon-black, black-gold, other compounds or organic compounds or mixtures, or the like. Metal contacts 525, 527, and 529 may transfer heat from absorber 537 to the poly layers of thermopile 501. The side of thermopile 501 in contact with absorber 537 will be referred to herein as the "hot junction." The side of thermopile 501 opposite the "hot junction" will be referred to herein as the "cold junction."

Stacked thermopile 501 may further include measurement contacts 502 and 535 for measuring a voltage drop across all thermocouple pairs. Measurement contacts 502 and 535 may be made of the same or a similar material as metal contact 525. In one example, measurement contact 502 may be placed on the cold junction end of N-Poly layer 503 and measurement contact 535 may be placed on the cold junction end of P-Poly layer 513. Thus, measurement contacts 502 and 535 may be positioned on either end of the series-connected thermocouple pairs. Therefore, the voltage across measurement contacts 502 and 535 represents the combined voltage across the three thermocouple pairs (N-Poly layers 503, 505, and 507 and P-Poly layers 509, 511, and 513).

In one example, the N-Poly layers, P-Poly layers, and insulating layers may have a thickness ranging from 0.05 to 0.5 microns. Further, the lengths of each layer may range from 10-100 microns. However, it should be appreciated by one of ordinary skill that layers having any thickness or length may be used.

In one example, the thermocouple pairs of thermopile 501 may instead be connected in parallel or may be connected in a combination of series and parallel. In another example, multiple stacked thermopiles 501 may be connected together in series, parallel, or a combination of series and parallel.

While stacked thermopile 501 is shown having three thermocouple pairs, one of ordinary skill will appreciate that any number of thermocouple pairs may be stacked vertically and added to stacked thermopile 501 in the manner described above. For instance, in one example, thermopile 501 may include ten or more thermocouple pairs.

Figure 6:
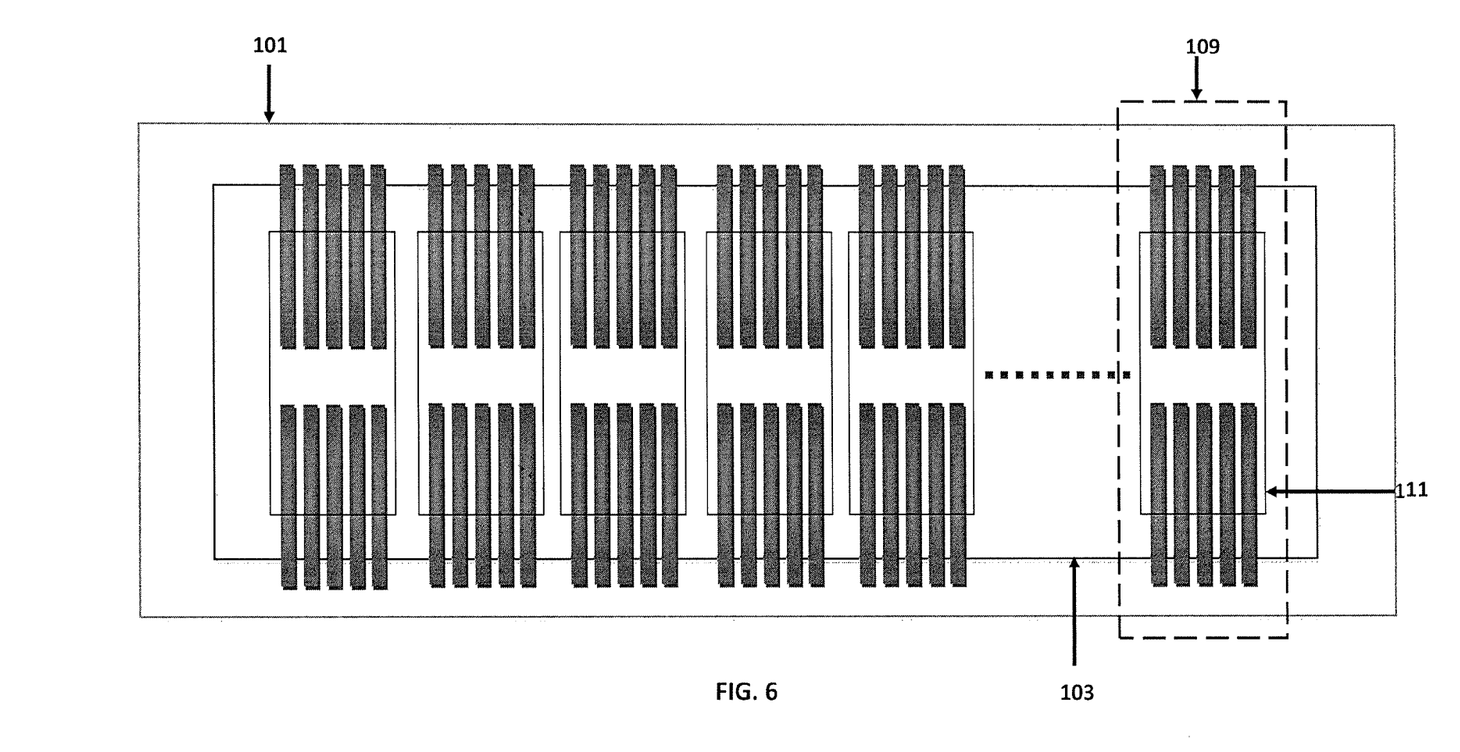
FIG. 6 illustrates an overhead view of an exemplary shared membrane thermopile array with thermopiles arranged in a 2×2 array.

FIG. 6 shows a thermopile sensor array with a plurality of thermopiles arranged in a line array.

The thermopile sensor array in FIG. 6 is adapted for monitoring radiation. The array includes a semiconductor substrate 101 and a shared support membrane 103 positioned on the semiconductor substrate. A plurality of thermopiles is arranged on the shared support membrane 103 and semiconductor substrate 101. A first portion of each of the plurality of thermopiles is in contact with the shared support membrane 103 and a second portion of each of the plurality of thermopiles is in contact with the semiconductor substrate 101.

One or more absorbers 111 are thermally coupled to each of the plurality of thermopiles. Each of the plurality of thermopiles is operable to generate a voltage in response to receiving radiation from the one or more absorbers 111. The voltage corresponds to an amount of received radiation.

Figure 7:
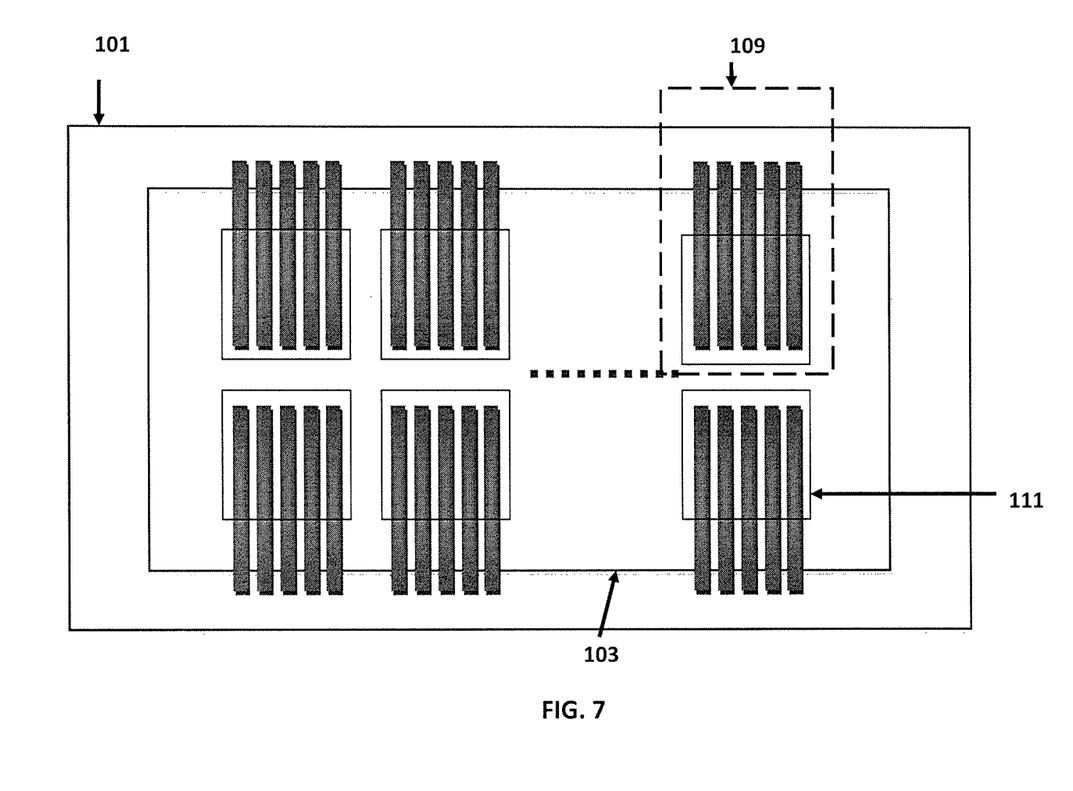
FIG. 7 illustrates an overhead view of an exemplary shared membrane thermopile array with thermopiles arranged in a line array.

FIG. 7 shows a thermopile sensor array with a plurality of thermopiles arranged in a 2×2 array.

The thermopile sensor array in FIG. 7 is adapted for monitoring radiation. The array includes a semiconductor substrate 101 and a shared support membrane 103 positioned on the semiconductor substrate. A plurality of thermopiles is arranged on the shared support membrane 103 and semiconductor substrate 101. A first portion of each of the plurality of thermopiles is in contact with the shared support membrane 103 and a second portion of each of the plurality of thermopiles is in contact with the semiconductor substrate 101.

One or more absorbers 111 are thermally coupled to each of the plurality of thermopiles. Each of the plurality of thermopiles is operable to generate a voltage in response to receiving radiation from the one or more absorbers 111. The voltage corresponds to an amount of received radiation.

Figure 8:
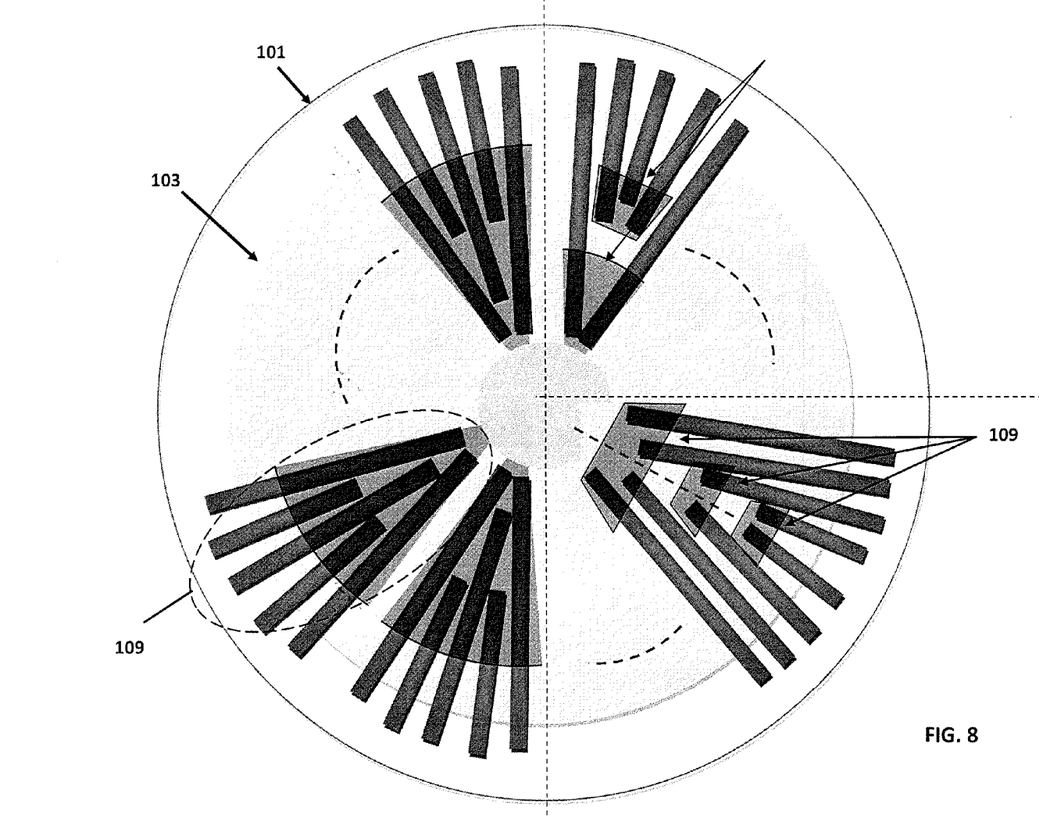
FIG. 8 illustrates an overhead view of an exemplary shared membrane thermopile array with thermopiles arranged in a circular array.

FIG. 8 shows a thermopile sensor array with a plurality of thermopiles arranged in a circular array.

The thermopile sensor array in FIG. 8 is adapted for monitoring radiation. The array includes a semiconductor substrate 101 and a shared support membrane 103 positioned on the semiconductor substrate. A plurality of thermopiles is arranged on the shared support membrane 103 and semiconductor substrate 101. A first portion of each of the plurality of thermopiles is in contact with the shared support membrane 103 and a second portion of each of the plurality of thermopiles is in contact with the semiconductor substrate 101.

One or more absorbers 111 are thermally coupled to each of the plurality of thermopiles. Each of the plurality of thermopiles is operable to generate a voltage in response to receiving radiation from the one or more absorbers 111. The voltage corresponds to an amount of received radiation.

Various configurations of a shared membrane thermopile array are provided in the examples above. Although a feature may appear to be described in connection with a particular embodiment, one skilled in the art would recognize that various features of the described embodiments may be combined. Moreover, aspects described in connection with an embodiment may stand alone.

What is claimed is:

1. A thermopile sensor array for monitoring radiation, the thermopile sensor array comprising:
a semiconductor substrate;
a shared support membrane positioned on the semiconductor substrate;
a plurality of thermopiles arranged on the shared support membrane and semiconductor substrate, wherein a first portion of each of the plurality of thermopiles is in contact with the shared support membrane, and wherein a second portion of each of the plurality of thermopiles is in contact with the semiconductor substrate; and
one or more absorbers thermally coupled to each of the plurality of thermopiles,
wherein each respective thermopile in the plurality of thermopiles is operable to generate a separate, independent output voltage in response to receiving radiation from the one or more absorbers, and
wherein the separate, independent output voltage generated by each respective thermopile corresponds to an amount of radiation received by said each respective thermopile.

2. The thermopile sensor array of claim 1, wherein the shared support membrane is a single continuous membrane.

3. The thermopile sensor array of claim 1, wherein the thermopile sensor array comprises only one shared support membrane.

4. The thermopile sensor array of claim 1, wherein the shared support membrane comprises a material having a thermal conductivity less than about 30 W/mK.

5. The thermopile sensor array of claim 1, wherein the shared support membrane comprises silicon nitride, silicon dioxide, or an organic plastic.

6. The thermopile sensor array of claim 1, wherein the shared support membrane has a thickness of about 0.1 μm to 5 μm.

7. The thermopile sensor array of claim 1, wherein a cavity is formed within the semiconductor substrate, and wherein the shared support membrane is positioned at least partially covering the cavity.

8. The thermopile sensor array of claim 1, wherein each thermopile of the plurality of thermopiles is separated from a neighboring thermopile by a distance of less than 12 μm.

9. The thermopile sensor array of claim 1, wherein the plurality of thermopiles comprises 32 or more thermopiles.

10. The thermopile sensor array of claim 1, wherein the plurality of thermopiles comprises 64 or more thermopiles.

11. The thermopile sensor array of claim 1, wherein a distance between an edge of the shared support membrane and any of the plurality of thermopiles is a least 100 μm.

12. The thermopile sensor array of claim 1, wherein a distance between an edge of the shared support membrane and any of the plurality of thermopiles is at least 150 μm.

13. The thermopile sensor array of claim 1, wherein a distance between an edge of the shared support membrane and any of the plurality of thermopiles is at least 200 μm.

14. The thermopile sensor array of claim 1, wherein the plurality of thermopiles are arranged in a 2×2 array, line array, or circular array.

15. The thermopile sensor array of claim 1, wherein each of the plurality of thermopiles comprises a plurality of thermocouple legs, and wherein the plurality of thermocouple legs of each of the plurality of thermopiles are arranged vertically on the shared support membrane.

16. A thermopile sensor array for monitoring radiation, the thermopile sensor array comprising:
a semiconductor substrate;
a shared support membrane positioned on the semiconductor substrate, wherein the shared support membrane comprises a material having a thermal conductivity less than about 30 W/mK;
a plurality of thermopiles arranged in a substantially parallel configuration along a length of the shared support membrane and semiconductor substrate, wherein a first portion of each of the plurality of thermopiles is in contact with the shared support membrane, and wherein a second portion of each of the plurality of thermopiles is in contact with the semiconductor substrate; and one or more absorbers thermally coupled to each of the plurality of thermopiles, wherein each respective thermopile in the plurality of thermopiles is operable to generate a separate and independent output voltage in response to receiving radiation from the one or more absorbers, and wherein the separate, independent output voltage generated by each respective thermopile corresponds to an amount of radiation received by said each respective thermopile.

17. The thermopile sensor array of claim 16, wherein the shared support membrane has a thickness of about 0.1 μm to 5 μm.

18. The thermopile sensor array of claim 16, wherein each thermopile of the plurality of thermopiles is separated from a neighboring thermopile by a distance of less than 12 μm.

19. The thermopile sensor array of claim 16, wherein a distance between an edge of the shared support membrane and any of the plurality of thermopiles is at least 100 μm.

20. The thermopile sensor array of claim 16, wherein a distance between an edge of the shared support membrane and any of the plurality of thermopiles is at least 150 μm.

21. The thermopile sensor array of claim 16, wherein a distance between an edge of the shared support membrane and any of the plurality of thermopiles is at least 200 μm.

22. The thermopile sensor array of claim 1 wherein every thermopile that is in contact with the semiconductor substrate is also in contact with the shared support membrane.

23. The thermopile sensor array of claim 16 wherein every thermopile that is in contact with the semiconductor substrate is also in contact with the shared support membrane.

24. The thermopile sensor array of claim 1 wherein each thermopile in the plurality of thermopiles is electrically isolated from other thermopiles in the plurality of thermopiles.

25. The thermopile sensor array of claim 1 wherein only one absorber is thermally coupled to each of the plurality of thermopiles.

26. The thermopile sensor array of claim 16 wherein each thermopile in the plurality of thermopiles is electrically isolated from other thermopiles in the plurality of thermopiles.

27. The thermopile sensor array of claim 16 wherein only one absorber is thermally coupled to each of the plurality of thermopiles.

* * * * *